United States Patent Office 3,630,938
Patented Dec. 28, 1971

3,630,938
CHROMATE AND ORGANOPHOSPHATE COMPOSITIONS AND METHODS FOR CONTROLLING SCALE AND INHIBITING CORROSION
Edwin S. Troscinski, Oak Lawn, Ill., assignor to Nalco Chemical Company, Chicago, Ill.
No Drawing. Filed Sept. 29, 1969, Ser. No. 862,050
Int. Cl. C02b 1/18, 5/02
U.S. Cl. 252—181
10 Claims

ABSTRACT OF THE DISCLOSURE

This invention relates to methods and compositions used to inhibit scale formation and/or the formation of solid scale forming salts and to prevent corrosion in water or brine comprising adding to said water or brine small amounts of certain compounds containing chromates and organophosphates.

INTRODUCTION

Most commercial waters contain alkali earth metal cations such as calcium, barium, magnesium, etc., and several anions such as bicarbonate, carbonate, sulfate, oxalate, phosphate, silicate, fluoride, etc. When combinations of these anions and cations are present in concentrations which exceed the solubility of their reaction products, precipitates form until these product solubility concentrations are no longer exceeded. For example, when the concentrations of calcium ion and carbonate ion exceed the solubility of the calcium carbonate reaction product, a solid phase of calcium carbonate will form. Solubility product concentrations are exceeded for various reasons, such as evaporation of the water phase, change in pH, pressure or temperature, and the introduction of additional ions which form insoluble compounds with the ion already present in the solution.

As these reaction products precipitate on the surfaces of the water carrying system they form scale. The scale prevents effective heat transfer, interferes with fluid flow, facilitates corrosive processes, and harbors bacteria. This scale is an expensive problem in many industrial water systems, causing delays and shut-downs for cleaning and removal.

Scale forming compounds can be prevented from precipitating by inactivating their cations with chelating or sequestering agents, so that the solubility of their reaction products is not exceeded. Generally, this requires many times as much chelating or sequestering agent as cation, and these amounts are not always desirable or economical.

Certain organophosphates have been found to be effective as hardness stabilizers to prevent scale formation. These organophosphates have been taught by Ralston, U.S. Pat. 3,393,150.

Another problem in water carrying systems is that waters obtained from the usual natural sources of supply such as rivers, wells, etc., at their normal pH are corrosive. Furthermore, the iron content of these natural waters has been observed to be sufficient to settle from the water and deposit, usually in the form of a gelatinous or solid scale of hydrous oxide, on the slugs and tubing with which the cooling water comes in contact. Such scale deposits or films derived from the water which contains, in addition to iron, the usual dissolved solids and/or colloidal materials are extremely undesirable since they cause a reduction in the heat transfer coefficient.

Inorganic chromates are frequently employed as corrosion inhibiting materials in industrial waters, particularly in circulating water systems for cooling towers.

In order to solve both of these problems, supplementary dispersants and/or hardness stabilizers are required in many systems using liquid acid chromate products. In order to apply this supplementary treatment, two liquid products have been used. This required feeding two liquids individually. Many operations have resorted to blending products in a single mixing tank and feeding as a single liquid. This procedure has been found to require special procedures and can lead to product incompatibility. A need exists to develop a liquid chromate product that would contain either a dispersant or hardness stabilizer. This product should be alkaline since chromate has much reduced oxidizing power and will not oxidize most organic materials in an alkaline solution.

OBJECTS

It is an object of this invention to prepare a stable liquid corrosion inhibiting and deposit control product.

More specifically, it is an object of this invention to prepare a stable composition containing a liquid chromate and an organic phosphate useful in aqueous systems.

It is a further object of this invention to provide a process for corrosion inhibition and deposit control in cooling water systems.

Further objects will be evident to those skilled in the art.

THE INVENTION

A new liquid chromate product has been developed that contains an organic phosphate hardness stabilizer. This product will fill a definite need in the industry. The product will provide excellent corrosion and scale control from a single liquid product if normal controls for chromate treated systems including pH control, are observed. System upsets to high pH (9.0) should have no effect on product performance, however.

This invention relates to a method and compositions for treating water so as to minimize the quantity of solids deposited therefrom and inhibit corrosion of metal surfaces with which the treated process water is in contact. This invention also relates to the control of corrosion and deposition of film and the removal of films deposited from circulating water.

More specifically, the invention involves combining the ingredients in a particular sequence in a particular alkaline pH range, depending upon the relative amounts of the chromate and the organic present.

This product allows single liquid feed of both chromate inhibitor and hardness stabilizer. This new product will give corrosion protection in recirculating water cooling systems. The new product will significantly reduce deposits in recirculating cooling water systems if proper controls are maintained. This product also has the advantages of being a different colored product, being yellow instead of the usual red, and also being alkaline rather than acidic.

Manufacture of the product involves the blending of components in a specified order at such a rate as to prevent precipitation of silicate.

THE CHROMATE COMPOUND

Chromate salts are often used as corrosion inhibitors in the treatment of industrial cooling towers. These chromates can be the well-known alkali metal chromates and dichromates. The most common forms of these compounds are the hexavalent alkali metal salts exemplified by sodium chromate and sodium dichromate. The new liquid chromate product of this invention contains from 1.0 to 40.0% of the chromate compound as $CrO_4^=$. Preferably, the chromate compound ranges from 18–25% by weight reported as $CrO_4^=$.

While crystalline sodium dichromate dihydrate could be used, the product is preferably made using 69% sodium dichromate liquor. If crystalline sodium dichromate dihydrate is used, it should be dissolved to form a 69% solution prior to addition to the product during manufacture.

THE ORGANIC PHOSPHATE STABILIZERS

Organic phosphate stabilizers are known to those skilled in the art. Especially useful scale inhibitors have been disclosed in Ralston, U.S. Pat. 3,393,150. These compounds have the general formula:

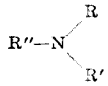

where R is:

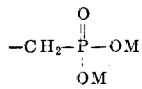

R' is selected from the group consisting of R and

—CH$_2$CH$_2$OH and R" is selected from the group consisting of R,

—CH$_2$CH$_2$OH and

where each M is independently selected from the group consisting of H, NH$_4$, alkali metals and polyvalent metals, $n$ is a whole number from 1–6.

Compounds having the following formulae are also useful:

(1) 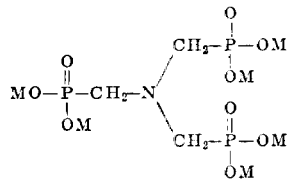

(2) 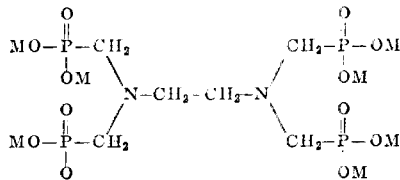

(3) 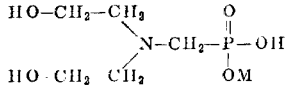

where each M is independently selected from the group consisting of H, NH$_4$, alkali metals, and polyvalent metals.

Irani et al. U.S. Pat. 3,288,846 discloses the preparation of organophosphoric acids generically termed "aminoalkylenephosphonic acids." They are characterized as containing one N—C—P linkage in their molecules and as having the formula:

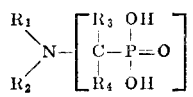

wherein R$_3$ and R$_4$ can be like or unlike, and are either hydrogen or organic radicals; and R$_1$ and R$_2$ can be like or unlike, and can be hydrogen, hydroxyl, aminoorganic radicals, or alkylene phosphonic acid radicals (such as that within the bracketed position of the formula). These organophosphonic acids are also useful as stabilizers for the composition of this invention. Their salts are likewise useful.

Useful phosphated polyhydroxy compositions are derived from the reaction of phosphorous pentoxide and a polyol composition of the formula:

(HO—)$_x$R[—O(R$_1$O—)$_z$CH$_2$CH$_2$OH]$_y$ wherein R is a saturated, hydrocarbon radical having 3–6 carbon atoms, R$_1$ is a member selected from the group consisting of —CH$_2$CH$_2$—, and

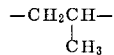

$x$ is a number average in the range of 0–5, inclusive, $y$ is a number average in the range of 1–6, inclusive, and the sum of $x$ plus $y$ equals 3–6, and $z$ is a number average in the range of 0–3, inclusive, said phosphated polyhydroxy compositions having an average of at least one and up to all of the hydroxyls of the 2-hydroxy ethyl groups and on an average of zero up to substantially all of said hydroxyl groups directly attached to the radical R replaced by phosphate ester groups derived from said phosphorous pentoxide, said phosphate ester groups consisting essentially of one or both of a member selected from the group consisting of:

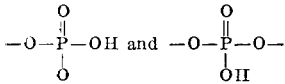

These compositions are disclosed in a copending application Ser. No. 559,723, filed June 23, 1966, entitled Scale Inhibiting Compounds, with Paul G. Vogelsang, Jr. as the applicant.

Other useful scale inhibitors that can be used in the product of this application are disclosed in copending applications Ser. No. 600,354, Stanford et al., filed Dec. 9, 1966, entitled Hydroxyamine Phosphate Ester Scale Inhibitors and the division application entitled Scale Inhibitors Ser. No. 796,183, filed Feb. 3, 1969.

These scale inhibitors are useful in the product of this invention. The polyphosphoric acid esters of hydroxy amines are disclosed and have at least one hydroxyl group of the amine connected by at least one carbon atom to a nitrogen atom of the amine. The phosphate ester group consists essentially of one or both of a member selected from the group consisting of:

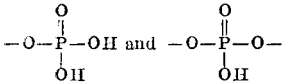

The salts of these esters are also useful in this invention.

Phosphate esters of hydroxy amines are also disclosed in which the hydroxyl groups of the amine are separated from a nitrogen atom of the amine by at least one carbon atom and the phosphate ester groups consist essentially of one or both of a member selected from the group consisting of:

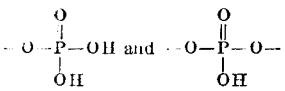

said hydroxy amine being from a class consisting of alkanol amines and oxyalkylated polyethylene polyamines having from 2–5 nitrogen atoms containing more than 30 moles of alkylene oxide per mole of amine and having a terminal 2-hydroxy ethyl group wherein the alkanol amines and oxyalkylated polyethylene polyamines have from 2–5 nitrogen atoms containing from 2–6 carbon atoms in the alkylene groups.

These polyphosphoric acid esters of hydroxy amines and the phosphate esters of hydroxy amines and their respective salts are useful as the organophosphate stabilizers of this invention.

SILICATE MATERIAL

If the iron content of process water is in excess of 0.03 p.p.m., a water-soluble alkali silicate such as sodium silicate is used in the composition which silicate inhibits the deposition of iron films therefrom. The principal used showed the following compounds in parts per million.

| Designation: | Total hardness as $CaCO_3$ | Ca as $CaCO_3$ | Mg as $CaCO_3$ | Alkalinity as $CaCO_3$ | Cl as NaCl | $SO_4$ as $Na_2SO_4$ | $SiO_4$ | Fe | F | $Al_2O_3$ |
|---|---|---|---|---|---|---|---|---|---|---|
| 1 | 945 | 795 | 150 | 150 | 1,450 | 1,500 | | | | |
| 2 | 400 | 250 | 150 | 55 | 600 | 1,500 | | | | |
| 3 | 134 | 90 | 44 | 55 | 310 | 430 | 35 | 0.5 | 3.9 | 1.0 |
| 4* | 142 | 82 | 60 | 108 | 14 | 43 | 3.1 | 0.009 | 0.1 | 0.3 |

*4 is Chicago, Illinois, tap water for comparison.

effect of the alkali silicate in such a system is to inhibit coagulation of iron which tends to deposit as a film. There is also a synergistic effect between the chromate and the silicate as far as corrosion inhibition is concerned. The silicate material could be diatomaceous earth or an alkali metal silicate, preferably sodium silicate.

PREPARATION

To prepare the composition of this invention, the components are blended in a specified order at such a rate as not to precipitate the silicate.

The proper sequence for the preparation of the product is water, organophosphate solution, basic compound, alkali metal silicate, and sodium dichromate liquor.

The organophosphate is in a water solution so as to yield a final product containing from 1–40% by weight of the organophosphate and preferably from 1–20% by weight.

The basic compound is then added to adjust the pH to from 8.0–14, and preferably from 10.5–12.5. Preferably, the basic compound is 50% sodium hydroxide. In a typical formulation of the product, 18% by weight of a 50% sodium hydroxide solution was needed.

The silicate material is added at a range of from 0–15% by weight, and preferably from 8–12% by weight, expressed as $SiO_2$. The silicate can be diatomaceous earth or an alkali metal silicate. Preferably sodium silicate is used. The silicate is added slowly so that it does not precipitate.

Lastly, the chromate compound is added slowly. Preferably, this should be a 69% sodium dichromate liquor. The chromate compound can range from 1.0–40% and preferably from 18–25% by weight, expressed as $CrO_4$.

A typical formulation contains the following proportions by weight:

Formulation 1

| | Percent |
|---|---|
| Water | 13.51 |
| NaOH | 18.25 |
| Sodium silicate [2] | 22.0 |
| Sodium dichromate liquor [1] | 41.1 |
| Organophosphate | 5.14 |
| | 100.00 |

[1] The sodium dichromate liquor was a 69% solution of sodium dichromate dihydrate in water.
[2] 4.37% as $SiO_2$.
[3] 10.4% as $CrO_4=$.

TEST RESULTS

Formulation 1 was tested using three different synthetic cooling waters. Analysis of the different waters Formulation 1 was evaluated in a laboratory test. A paper on this test was presented under the title "Heat Transfer Testing of Cooling Water Treatments" at the 17th Annual Conference of the National Association of Corrosion Engineers, Buffalo, N.Y., Mar. 13–17, 1961.

The test consists of a water reservoir, a test vessel, a heat transfer tube, clear plastic blocks for holding coupons and a cooling condenser. Water is pumped from the test vessel through the system. Make-up water is automatically added from the reservoir to the system. An aerator keeps the water saturated with air, simulating the conditions in most open cooling tower basins. All parts of the system other than the heat transfer tube and corrosion coupons are made of glass, plastic or stainless steel.

Coupons and heat transfer tubes can be handled by any of the accepted procedures for preparing and cleaning metal specimens. Usually the tubes are simply solvent cleaned, dried and weighed. Both tube and coupons are inspected before the test for flaws or imperfections which might give atypical results. After tubes and coupons are installed, the test vessel and reservoir are filled with the test water containing the desired treatment. After startup, the pH of the vessel and reservoir are checked daily and adjusted when necessary.

Careful visual observations are made of the tube and coupons, and photographs are taken whenever significant changes occur. Water in the reservoir usually lasts five days; therefore the reservoir must be refilled twice during a two-week test.

Coupons are removed from the blocks on the fourth day (end of the high level treatment) and the seventh day (half way point in the test). On the fourteenth day, the tube is photographed in place, and the test is shut down. The tube and the last coupon are removed, dried and photographed if significant deposits or corrosion are present. Then the tube and coupon are weighed, cleaned to remove all deposits and reweighed to determine amount of deposit and corrosion loss. All coupons removed during the test are handled the same. Tube and coupons are carefully inspected for evidence of tuberculation and pitting. Unusual deposits may be analyzed gravimetrically or by X-ray diffraction.

Analysis of data from replicate test runs has shown that the 95% confidence range of individual determinations of corrosion and deposition on heat transfer tubes is ±20% or 1 m.p.y., whichever is greater. On coupons, the range is ±10% or 1 m.p.y. The larger standard error on the heat transfer tubes results from the much larger surface area involved and from the possibility of losing small amounts of deposit while removing tubes from the units.

Table II lists the test results.

TABLE II

| | | Heat transfer test results | | | | |
|---|---|---|---|---|---|---|
| Test No. | Water used | 14 day coupon | | 14 day tube | | Remarks |
| | | Mg. | M.p.y. | Mg. | M.p.y. | |
| 1 | 1 | 12 | 0.6 | 304 | 1.0 | Coupons not sandblasted. |
| 2 | 1 | 29 | 1.5 | 169 | 0.8 | Tubes and coupons passivated from 24 hours with 1,000 p.p.m. $NaNO_2$. |
| 3 | 1 | 58 | 3.2 | 302 | 1.5 | High level 108 p.p.m. |
| 4 | 1 | 63 | 3.1 | 300 | 1.2 | Do. |
| 5 | 3 | 105 | 4.0 | 337 | 1.5 | |
| 6 | 2 | 40 | 1.9 | 347 | 1.6 | 2.7 p.p.m. Al fed continuously. |
| 7 | 1 | 63 | 1.7 | 835 | 2.1 | 4.0 p.p.m. Fe fed continuously. |
| 8 | 1 | 29 | 1.9 | 608 | 1.7 | Typical corrosion inhibitor—Sample 36. |

Tube deposits obtained varied from 169 to 347 mg. Tube deposits using Sample 36 was 608 mg. As can be readily seen, Formulation 1 was a much better deposit and corrosion inhibitor as determined from the tube measurements. Tube corrosion rates varied from 0.8 to 1.6 m.p.y.

Other formulations within the ranges given were also tested, but Formulation 1 was generally preferred.

What I claim and desire to protect by Letters Patent is:

1. A liquid corrosion inhibiting and scale control composition comprising:
 (A) of from 1.0–40.0% of a chromate compound expressed as $CrO_4$ selected from the group consisting of alkali metal chromate and alkali metal dichromates; and
 (B) of from 1.0–40.0% of an organic phosphate stabilizer selected from the group consisting of:
  (1) a compound of the general formula:

where R is

R' is selected from the group consisting of R and —$CH_2CH_2OH$, and R″ is selected from the group consisting of R, —$CH_2CH_2OH$ and

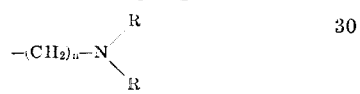

where each M is independently selected from the group consisting of H, $NH_4$, alkali metal, and polyvalent metals, and $n$ is a whole number from 1–6;

(2) a compound of the formula:

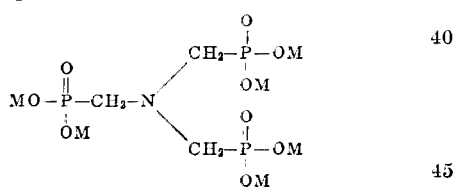

where each M is independently selected from the group consisting of H, $NH_4$, alkali metal, and polyvalent metals;

(3) a compound of the formula:

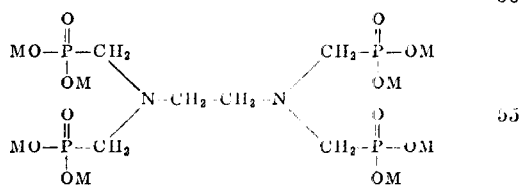

where each M is independently selected from the group consisting of H, $NH_4$, alkali metal, and polyvalent metals;

(4) a compound of the formula:

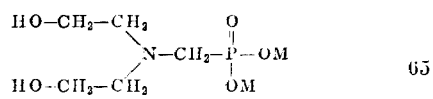

where each M is independently selected from the group consisting of H, $NH_4$, alkali metal, and polyvalent metals;

(5) aminoalkylenephosphoric acids and salts of the formula:

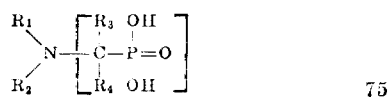

wherein $R_3$ and $R_4$ are independently selected from the group consisting of hydrogen and organic radicals; and $R_1$ and $R_2$ are independently selected from the group consisting of hydrogen, hydroxyl, amino organic radicals and alkylene phosphoric acid radicals;

(6) a phosphated polyhydroxy composition derived by the reaction of phosphorous pentoxide and a polyol composition of the formula:

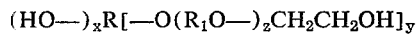

wherein R is a saturated, hydrocarbon radical having 3–6 carbon atoms, $R_1$ is a member selected from the group consisting of

and

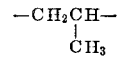

$x$ is a number average in the range of 0–5, inclusive, $y$ is a number average in the range of 1–6, inclusive, and the sum of $x$ plus $y$ equals 3–6, and $z$ is a number average in the range of 0–3, inclusive, said phosphated polyhydroxy compositions having an average of at least one and up to all of the hydroxyls of the 2-hydroxy ethyl groups and on an average of zero up to substantially all of said hydroxyl groups directly attached to the radical R replaced by phosphate ester groups derived from said phosphorous pentoxide, said phosphate ester groups consisting essentially of one or both of a member selected from the group consisting of:

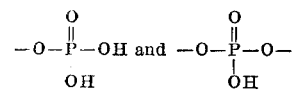

(7) polyphosphoric acid esters of hydroxy amines in which at least one hydroxyl group of the amine is connected by at least one carbon atom to a nitrogen atom of the amine, and the salts of said esters, the phosphate ester group consisting essentially of one or both of a member selected from the group consisting of:

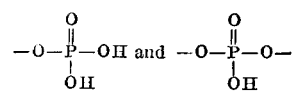

(8) a phosphate ester of a hydroxy amine in which the hydroxyl groups of the amine are separated from a nitrogen atom of the amine by at least one carbon atom and the phosphate ester groups consist essentially of one or both of a member selected from the group consisting of:

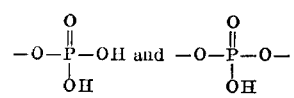

said hydroxy amine being from a class consisting of alkanol amines and oxyalkylated polyethylene polyamines having 2–5 nitrogen atoms containing more than 30 moles of alkylene oxide per mole of amine and having a terminal 2-hydroxy ethyl group wherein the alkanol amines and oxyalkylated polyethylene polyamines having 2–5 nitrogen atoms containing 2–6 carbon atoms in the alkylene groups:
 (C) a basic compound selected from the group consisting of KOH, NaOH, $NH_4OH$, so as to raise the pH of a solution to from 8.0 to 14.0;
 (D) of from 0–15% by weight of a silicate material selected from the group consisting of diatomaceous earth and alkali metal silicate, expressed as $SiO_2$; and
 (E) water.

2. The liquid corrosion inhibiting and scale control composition of claim 1 in which the alkali metal silicate is sodium silicate and the chromate compound is sodium chromate.

3. The liquid corrosion inhibiting and scale control composition of claim 1 in which the chromate compound is sodium dichromate.

4. The liquid corrosion inhibiting and scale control composition of claim 1 in which the chromate compound comprises of from 18–25% of the composition, expressed as $CrO_4$.

5. The liquid corrosion inhibiting and scale control composition of claim 1 in which the alkali metal silicate comprises of from 8–12% of the composition, expressed as $SiO_2$.

6. The liquid corrosion inhibiting and scale control composition of claim 1 in which the organic phosphate stabilizer comprises of from 1.0–20% of the composition and the pH is from 10.5–12.5.

7. A mehod of inhibiting the precipitation of scale forming salts in a water system comprising adding to said system of from 0.5–1000 p.p.m. of the composition of claim 1.

8. A process for preventing scale deposits of at least one of barium sulfate, calcium sulfate, and calcium carbonate on metal surfaces in contact with water containing said scale forming chemicals which comprises contacting said metal surfaces with said water while maintaining therein an effective scale inhibiting amount of the composion of claim 1.

9. A process for combining a chromate and an organic ingredient into a stable liquid corrosion inhibiting and deposit control product which comprises:

(A) adding an organophosphate stabilizer to water selected from the group consisting of:

(1) a compound of the general formula:

where R is

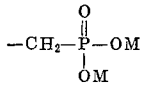

R′ is selected from the group consisting of R and —CH₂CH₂OH, and R″ is selected from the group consisting of R, —CH₂CH₂OH and

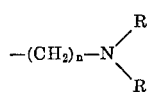

where each M is independently selected from the group consisting of H, NH₄, alkali metal, and polyvalent metals, and $n$ is a whole number from 1–6;

(2) a compound of the formula:

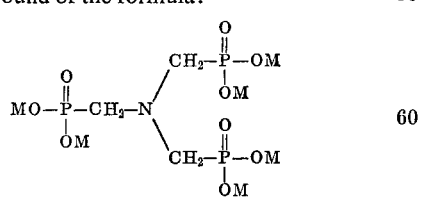

where each M is independently selected from the group consisting of H, NH₄, alkali metal, and polyvalent metals;

(3) a compound of the formula:

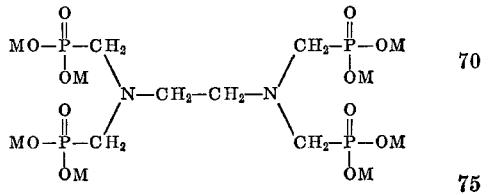

where each M is independently selected from the group consisting of H, NH₄, alkali metal, and polyvalent metals;

(4) a compound of the formula:

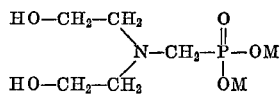

where each M is independently selected from the group consisting of H, NH₄, alkali metal, and polyvalent metals;

(5) aminoalkylenephosphoric acids and salts of the formula:

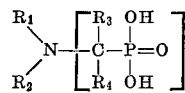

wherein $R_3$ and $R_4$ are independently selected from the group consisting of hydrogen and organic radicals; and $R_1$ and $R_2$ are independently selected from the group consisting of hydrogen, hydroxyl, amino organic radicals and alkylene phosphoric acid radicals;

(6) a phosphated polyhydroxy composition derived by the reaction of phosphorous pentoxide and a polyol composition of the formula:

$$(HO-)_xR[-O(R_1O-)_zCH_2CH_2OH]_y$$

wherein R is a saturated, hydrocarbon radical having 3–6 carbon atoms, $R_1$ is a member selected from the group consisting of —CH₂CH₂— and

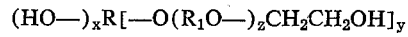

$x$ is a number average in the range of 0.5, inclusive, $y$ is a number average in the range of 1–6, inclusive, and the sum of $x$ plus $y$ equals 3–6, and $z$ is a number average in the range of 0–3, inclusive, said phosphated polyhydroxy compositions having an average of at least one and up to all of the hydroxyls of the 2-hydroxy ethyl groups and on an average of zero up to substantially all of said hydroxyl groups directly attached to the radical R replaced by phosphate ester groups derived from said phosphorous pentoxide, said phosphate ester groups consisting essentially of one or both of a member selected from the group consisting of:

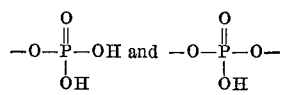

(7) polyphosphoric acid esters of hydroxy amines in which at least one hydroxyl group of the amine is connected by at least one carbon atom to a nitrogen atom of the amine, and the salts of said esters, the phosphate ester group consisting essentially of one or both of a member selected from the group consisting of:

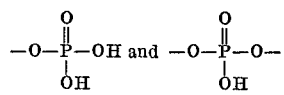

(8) a phosphate ester of a hydroxy amine in which the hydroxyl groups of the amine are separated from a nitrogen atom of the amine by at least one carbon atom and the phosphate ester groups consist essentially of one or both of a member selected from the group consisting of:

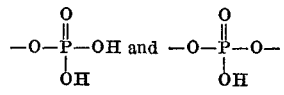

said hydroxy amine being from a class consisting of alkanol amines and oxyalkylated polyethylene polyamines having 2–5 nitrogen atoms containing more than 30 moles of alkylene oxide per mole of amine and having a terminal 2-hydroxy ethyl group wherein the alkanol amines and oxyalkylated polyethylene polyamines having 2–5 nitrogen atoms containing 2–6 carbon atoms in the alkylene groups;

(B) adjusting the pH with caustic to from 8.0–14.0;

(C) slowly adding an alkali metal silicate at from 5–15% by weight expressed as $SiO_2$;

(D) adding a liquid chlorate compound selected from the group consisting of sodium chromate and sodium dichromate of from 1.0–40.0% by weight expressed as $CrO_4$ slowly so that the silicate does not precipitate as $SiO_2$; and (E) forming a completed, stable product useful for inhibiting corrosion and controlling scale.

10. The process of claim 9 in which the sodium dichromate is 69% $Na_2Cr_2O_7 \cdot 2H_2O$.

References Cited

UNITED STATES PATENTS

| | | | |
|---|---|---|---|
| 3,303,139 | 2/1967 | Blaser | 252—180 |
| 3,341,467 | 9/1967 | Hwa | 252—389 |
| 3,347,797 | 10/1967 | Kuegemann | 252—175 |
| 3,393,150 | 7/1968 | Ralston | 210—58 |
| 3,429,824 | 2/1969 | Tate | 252—180 |
| 3,431,217 | 3/1969 | Hwa | 252—175 X |
| 3,434,969 | 3/1969 | Ralston | 252—180 X |
| 3,462,365 | 8/1969 | Vogelsang | 210—58 |
| 3,477,956 | 11/1969 | Stanford | 252—180 X |
| 3,502,587 | 3/1970 | Stanford | 252—180 |

JOHN T. GOOLKASIAN, Primary Examiner

M. E. McCAMISH, Assistant Examiner

U.S. Cl. X.R.

21—2.7; 252—8.55, 89, 175, 389; 210—58